July 6, 1937.  A. E. NORTHUP  2,086,172
VEHICLE BODY
Filed Nov. 2, 1935   2 Sheets-Sheet 1
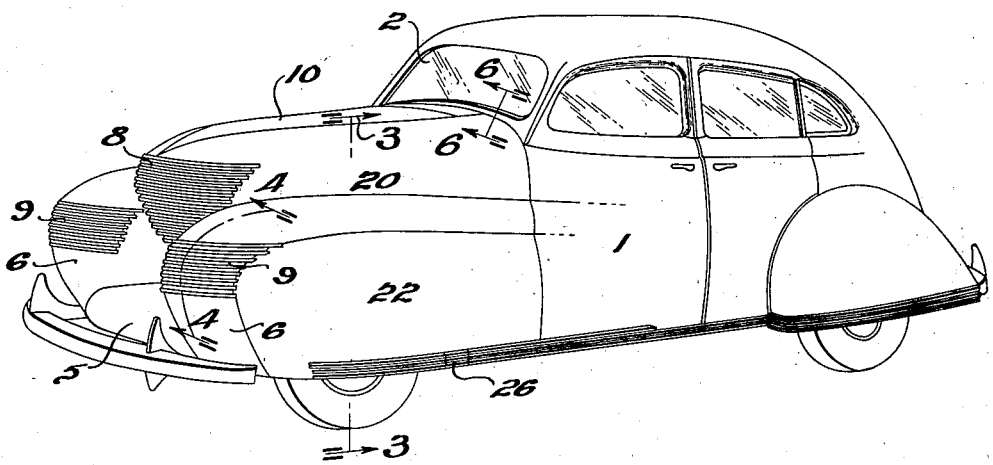
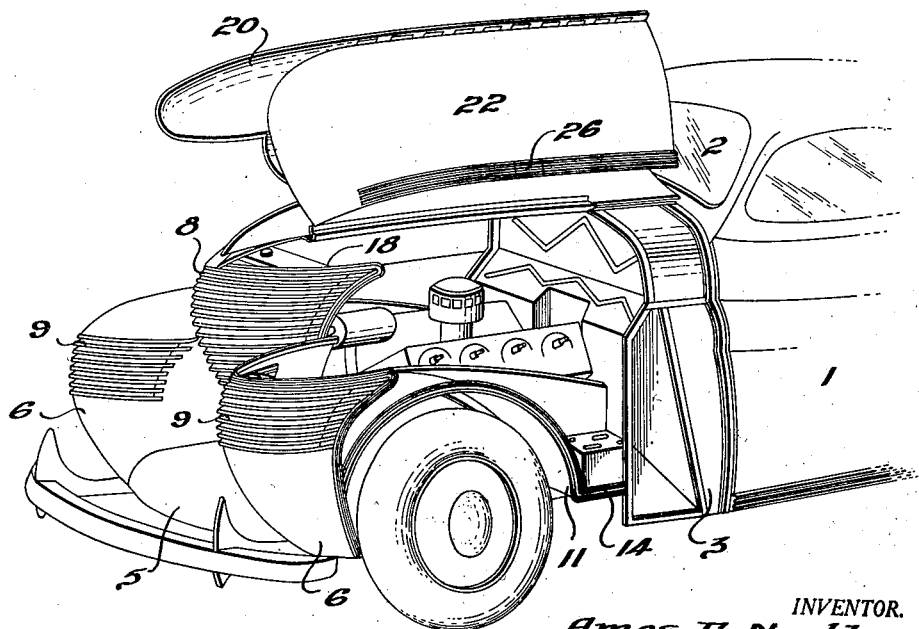
INVENTOR.
Amos E. Northup.
BY
Harness, Dickey, Pierce & Hann.
ATTORNEYS.

July 6, 1937.  A. E. NORTHUP  2,086,172
VEHICLE BODY
Filed Nov. 2, 1935  2 Sheets-Sheet 2
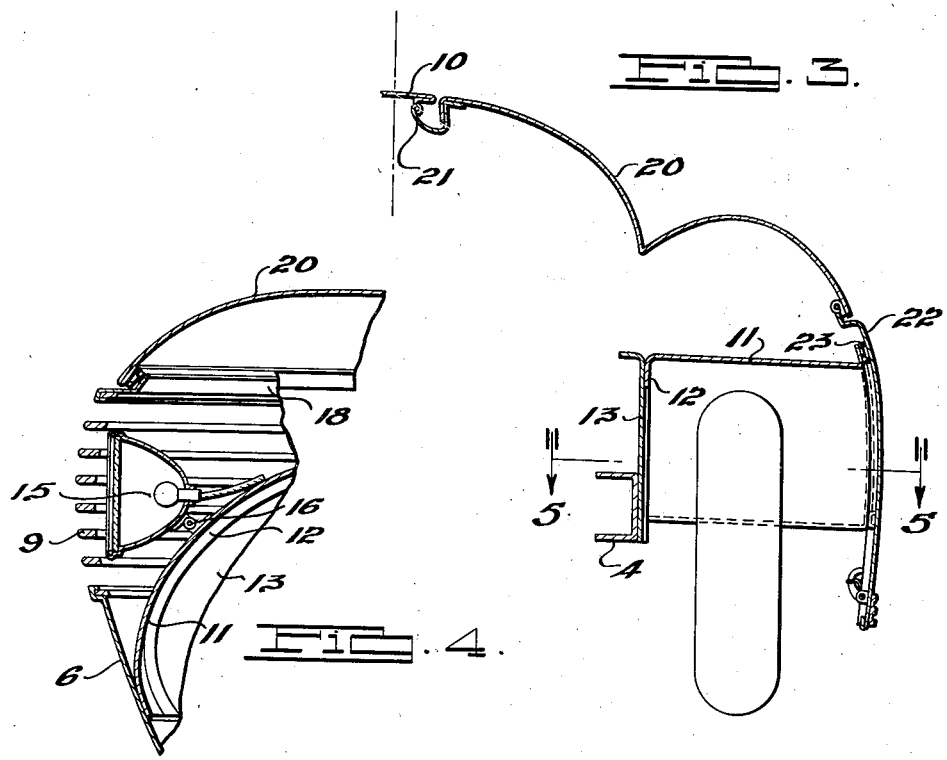
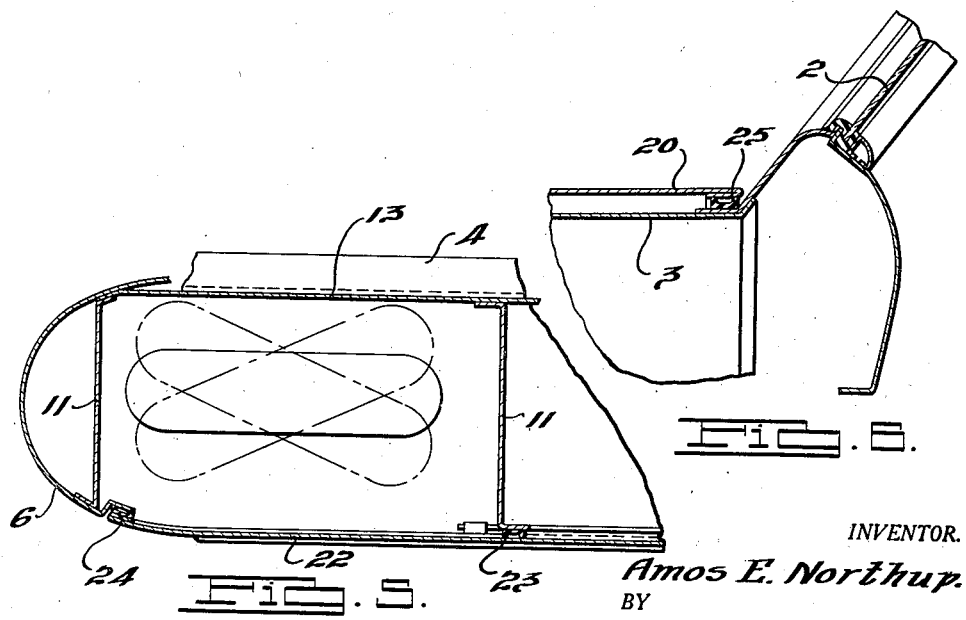
INVENTOR.
Amos E. Northup.
BY
Harness, Dickey, Pierce & Hann.
ATTORNEYS.

Patented July 6, 1937

2,086,172

UNITED STATES PATENT OFFICE 2,086,172

VEHICLE BODY

Amos E. Northup, Pleasant Ridge, Mich., assignor to The Murray Corporation of America, a corporation of Delaware Application November 2, 1935, Serial No. 47,929

15 Claims. (Cl. 180—69)

This invention relates to automobile body constructions. More particularly, it relates to a novel form of hood and fender construction at the front portion of a vehicle body.

The general object of the present invention is to provide a front end construction for automotive vehicles which will generally improve the streamlining thereof, provide an exceptionally attractive appearance, and yet permit of easy access to the engine and front assembly.

The present invention contemplates the provision of a front end structure comprising a member permanently secured to the vehicle body, which constitutes the radiator shell and also front portions of each of the front fenders. This structure is permanently secured to the front end of the automobile and is supported with respect thereto by securement to the radiator of the automobile and on each of its lateral sides is supported by direct securement to fenders which surround and enclose each of the front wheels. Grill work is provided in the front of the radiator shell and similar grill work is provided in the front portions of each of the front fender elements. A displaceable hood is pivotally supported substantially in its axial central portion on the body and has on each side a pair of pivoted wings hingedly secured thereto. One of these wings constitutes a closure for the top of the engine compartment and the revealed portion of the top of one of the front fenders. The second portion of the hood structure constitutes a closure for the outboard side of the front fender. The hood, as a whole, extends rearwardly sufficiently far so that it will mate with the front vertical edge of the front door and also mate with the lower windshield header. It will be appreciated in this construction, no revealed portion of the cowl is necessary.

Another object of the present invention consists in a novel means for mounting the headlights of a vehicle completely enclosed in the space between the permanent front fender and the false fender or hood structure covering the permanent fender.

Still further, the invention contemplates the provision of a novel means for enclosing the front wheels of an automobile in order to effect streamlining of the front end thereof, and the provision of easily displaceable means in order that access may be had to the front wheels when repairs or tire changes are necessary.

Yet another object of the present invention consists in the provision of a step portion rearwardly of the permanent fender in the construction described above, providing space for mounting a storage battery in easily accessible shielded position.

Yet another object of the present invention consists in the provision of novel means for locking the hood structure in position with respect to the body on which it is mounted.

Many other and further objects and advantages will become apparent from the following specification when considered in connection with the accompanying drawings forming a part thereof.

In the drawings,

Fig. 1 is a side perspective view of an automobile body showing the novel front end construction.

Fig. 2 is an enlarged perspective view, similar to Fig. 1, of the front portion of the body showing the hood raised.

Fig. 3 is a transverse sectional view taken on the line 3—3 of Fig. 1 showing the manner in which the hood and revealed portion of the fender mates with the rear portion of the fender to form an enclosing housing for the front wheel.

Fig. 4 is a sectional view, taken on the line 4—4 of Fig. 1, showing, in detail, the mounting of a front headlight with respect to the fender.

Fig. 5 is a sectional view taken on the line 5—5 of Fig. 3 showing the housing for the front wheel and the manner in which the hood mates therewith.

Fig. 6 is a sectional view taken on the line 6—6 of Fig. 1 showing the manner in which the rear marginal edge of the hood mates with the body proper.

With more particular reference to the drawings, the specific embodiment of the invention disclosed therein comprises a conventional automobile body having front doors 1, a windshield 2, and a cowl section 3. Supported directly on sill members 4 at the front portion of the body is a front section comprising a radiator shell 5 and front fender portions 6 on either side thereof. These front fender portions may either be formed integrally with the radiator shell 5 or permanently secured thereto. The radiator shell 5 is provided at the front portion thereof with grill work 8 preferably comprising an integral casting directly secured to the paneling constituting the front portion of the vehicle body. The front fender portions 6 also have grill work 9 of a similar nature permanently secured thereto. The grill work of these front fender portions is shown in detail in Fig. 4.

This grill work is preferably of light weight cast metal and constitutes a plurality of flat bars extending transversely and substantially spaced from each other.

A permanently anchored panel 10 of substantially triangular shape serves to interconnect the forward top portion of the radiator shell with the cowl section 3. This panel 10 serves to anchor the front section of the vehicle body rigidly with respect to the cowling and forms a means for supporting the hood sections hereinafter described.

Permanent fenders 11 serve to enclose each of the front wheels. These fenders each have an arcuate top portion of a curvature formed on the arc of a circle about the axis of rotation of the front wheels and are anchored at their forward ends by direct securement to the front fender portion of the front section.

The rear ends of these fenders are preformed to provide a rearwardly extending step portion 14 the rear end of which may be permanently secured to the cowling. This step portion provides a convenient place for mounting a storage battery.

These fenders 11 each has a flange 12 at its inner lateral side which is preferably anchored to a vertically disposed apron 13 secured to one of the sills 4 of the body and serves to enclose the inner axial side of the wheel compartment formed by the fender.

Rearwardly of the grill work 9 in each of the front fender portions of the structure is a headlight 15 mounted on a suitable bracket 16 on the upper surface of the fender 11. This headlight is substantially conventional in construction and is adapted to illuminate the road in front of the vehicle.

The marginal edges of the radiator shell and the front fender portion connected thereto are preformed to provide a rabbet generally designated 18 which serves to seat the marginal edge of the hood structure.

The improved hood comprises on each side, a pair of sections of sheet metal hinged together and hinged to the central panel 10. The main section 20 of this hood structure is hinged directly to one of the lateral sides of the central panel 10 by means of a longitudinally extending piano hinge 21. A skirt panel 22 is secured to the outer marginal edge of the primary panel 20 and serves to provide a closure for the lateral side of the body outside of the front wheel thereof. It will be apparent that the forward marginal edges of the hood sections 20 and 22 are adapted to seat within the rabbet formed on the adjacent marginal edge of the radiator shell and front fender portion of the front section. Suitable channel shaped weather stripping 23 is provided around the outer marginal edge of the fender 11 and is adapted to engage the inner surface of the skirt panel 22 and effect a tight closure between this lateral side edge of the front fender and the hood structure, thus creating a wheel housing for the front wheel which is completely cut off and enclosed from the remainder of the space enclosed by the hood. Similar weather stripping 24 may be secured to the forward marginal edge of the skirt panel of the hood which seats in the rabbet of one of the front fender portions in order to provide an effective tight closure at this joint. Additional similar weather stripping sections 25 may extend along the rear edge of the cowling 3 to effect a tight closure of the hood with respect to the cowling which it covers. The skirt panel of the hood is provided in its lower marginal edge with a latch member adapted to engage the adjacent portion of the cowling in order to firmly lock the hood panel with respect to the body of the automobile.

It will be apparent that when the hood structure as a whole is raised it will expose the front wheel and the engine as well as the storage battery located on the rearwardly extending step 14 of the fender 11. When the hood is in the closed position shown in Figure 1, it will be appreciated that this hood serves to provide an effective closure for the motor compartment as well as the front wheel housing and the headlight assembly.

It will be apparent that the closure around the front wheel is sufficiently large to permit turning of the front wheel necessary for steering.

It will be understood that the specific embodiment of the invention herein shown and described is merely illustrative of one of many forms which the inventive concept defined in the following claims may take. Many other and further modifications will be apparent to those skilled in the art.

What is claimed is:

1. An automobile having a displaceable hood hingedly connected thereto, said hood having a panel extending downwardly outside of the front wheel of said automobile.

2. An automobile having a displaceable hood, said hood being hingedly connected to said automobile and having a portion adapted to cover the engine compartment, a portion forming the top of the front fender and a portion adapted to form a side wall for the front fender on the outboard side of the wheel.

3. An automobile having a displaceable hood hingedly connected thereto, said hood having a main portion adapted to cover the engine compartment and having hingedly connected thereto a side panel adapted to enclose one of the front wheels of said automobile.

4. In an automobile body construction, a fender adapted to cover a wheel, a false fender located above said fender removably mounted on and disposed in spaced relation thereto and a head light mounted in said space.

5. In an automobile body construction, a fender adapted to cover a wheel, a false fender formed of sheet metal located above said fender and spaced therefrom, and a headlight located in said space, said false fender being displaceably mounted on said fender.

6. In an automobile body construction, a fender adapted to enclose the top and one axial side of a wheel and a false fender displaceably mounted thereon adapted to overlie the top of said fender and to enclose the other axial side of said wheel.

7. In an automobile body construction, a front section comprising a radiator shell and forward portions of both front fenders, said front section being permanently mounted on said body, a hood displaceably mounted with respect to said body adapted to mate with said front section and enclose the outboard sides of the front wheels thereof.

8. In an automobile body construction, panels arranged to enclose the front, rear and inboard sides of the front wheels and displaceable panels connected to a motor enclosing hood adapted to mate therewith for enclosing the outboard sides of the front wheels.

9. In an automobile body construction, panels arranged to form a housing above and on three sides of a front wheel and a hingedly mounted displaceable panel connected to a motor enclosing hood adapted to constitute the fourth side of said housing.

10. In an automobile body, a hood for enclosing the motor compartment comprising a pair of panels hinged together, one of said panels being hinged to said body and constituting a portion of one of the front fenders.

11. In an automobile body construction, a hood for enclosing the motor compartment comprising a pair of panels hinged together, said panels together forming a portion of the front fender.

12. In an automobile body construction, a front section comprising a radiator shell and front fender portions permanently secured thereto, said fender portions being provided with a rabbet in their marginal edges adapted to receive a displaceable hood.

13. In an automobile body construction, a front section comprising a radiator shell and front fender portions permanently secured thereto, a panel interconnecting said front section and the cowling of said body, a hood hinged to said panel and adapted to mate with said radiator shell and fender portions and forming a closure on the outboard side of one of the front wheels.

14. In an automobile body construction, a sheet metal hood hingedly mounted on said body and extending from the outboard side of a wheel on one side of a vehicle to the outboard side of a wheel on the opposite side thereof, the sides of said hood extending downwardly and providing one wall of a housing for each of said wheels.

15. A vehicle body construction including in combination a cowl and a radiator grill, a tie member rigidly interconnecting said cowl and grill, and a hood member comprising a pair of panels pivotally connected together, one of said panels being pivotally connected to said tie member, the other of said panels extending downwardly over the outboard side of one wheel of the vehicle.

AMOS E. NORTHUP.